United States Patent [19]
Nishida et al.

[11] Patent Number: 5,366,252
[45] Date of Patent: Nov. 22, 1994

[54] INFRARED-ABSORBING MARK PRINTED MATTER

[75] Inventors: Masato Nishida, Ibaraki; Toshio Oshima, Toride; Tsunemi Ohiwa, Osaka; Takato Karashima, Nishinomiya, all of Japan

[73] Assignee: Hitachi Maxell, Ltd., Osaka, Japan

[21] Appl. No.: 4,271

[22] Filed: Jan. 14, 1993

[30] Foreign Application Priority Data

Jan. 16, 1992 [JP] Japan .................. 4-026147

[51] Int. Cl.⁵ .............................. B42D 15/00
[52] U.S. Cl. ........................ 283/94; 283/88
[58] Field of Search ...................... 283/88, 94

[56] References Cited

U.S. PATENT DOCUMENTS 4,889,365 12/1989 Chouinard ................... 283/88 X

FOREIGN PATENT DOCUMENTS

| | | |
|---|---|---|
| 0263446 | 4/1988 | European Pat. Off. . |
| 58-45999 | 3/1983 | Japan . |
| 2013394 | 1/1987 | Japan ................. 283/88 |
| 3261596 | 11/1991 | Japan ................. 283/88 |
| 4131296 | 5/1992 | Japan ................. 283/88 |
| 4189196 | 7/1992 | Japan ................. 283/88 |

OTHER PUBLICATIONS

JP2173890 (Abstract).
JP4131292 (Abstract).
JP3261596 (Abstract).
JP4239697 (Abstract).
JP3285966 (Abstract).
JP3190972 (Abstract).
JP3075198 (Abstract).
European Search Report.

*Primary Examiner*—Paul A. Bell
*Attorney, Agent, or Firm*—Birch, Stewart, Kolasch & Birch

[57] ABSTRACT

An infrared-absorbing mark printed matter in which an infrared-absorbing mark is formed on a substrate by printing with an ink having high light absorptivity in the infrared region; the infrared-absorbing mark is covered up by smearing with an ink having high light absorptivity in the visible region and pervious to light in the infrared region to form a colored concealing layer; and on the colored concealing layer is formed a white concealing layer by printing with an ink containing a white pigment and an extender pigment of which at least part of the particles are those having an average particle size of 3 to 20 μm.

5 Claims, 1 Drawing Sheet

INFRARED-ABSORBING MARK PRINTED MATTER

BACKGROUND OF THE INVENTION

1. Field of the Invention

The present invention relates to cards containing infrared-absorbing bar codes and more specifically to bar-coded cards wherein the bar code can be perfectly concealed so as not to be visible.

2. Discussion of the Related Art

Recently, as a measure against tampering of magnetic records on private cards, ID cards and the like, it is practiced to print fixed information, such as magnetic bar codes or infrared-absoring bar codes, and provide thereon a covering layer or other covertures to conceal these bar codes. For example, the whole area of the infrared-absorbing bar code printed on a voting card is covered up by smearing with an ink which has high light absorptivity in the visible region but low light absorptivity in the infrared region (Japanese Patent Application Kokai No. 58-45999). This method, however, had the problem of a disagreeable visual image because of the black color of the ink which has low light absorptivity in the infrared region. This method also had the problem that it was incapable of perfectly concealing the bar code in order that it would be invisible to the naked eye.

In order to eliminate these problems to improve image and perfectly conceal the bar code so that it is invisible to the naked eye, it has been tried to cover up the infrared-absorbing bar code by smearing with an ink having high light absorptivity in the visible region but low light absorptivity in the infrared region and printing thereon with a white ink comprising titanium oxide to form a white concealing layer. It has further been attempted to print a pattern on the white concealing layer.

However, even if such a white concealing layer is provided by printing with a white ink comprising titanium oxide, it is impossible to attain perfect concealment of the infrared-absorbing bar code in order that it will be invisible to the naked eye. Also, when the white concealing layer is made thick or additional printing of a pattern is made thereon to assure perfect concealment of the infrared absorbing bar code, there arises the problem that when the bar code-printed objects are placed one upon another or piled up, the bar code-printed portions become bulky or bulgy, giving rise to trouble in handling or use of the objects (such as cards).

SUMMARY OF THE INVENTION

The present invention has been achieved as an outcome of extensive studies conducted in view of the above circumstances. According to this invention, an infrared-absorbing mark (or marks) formed by printing on a substrate is covered up by smearing with an ink having high light absorptivity in the visible region and pervious to light in the infrared region, thus forming a colored concealing layer on the mark, and on this colored concealing layer there is further provided a white concealing layer by printing on the colored concealing layer with an ink containing a white pigment and an extender pigment of which at least part of the particles are those having an average size of 3 to 20 μm, thereby achieving perfect concealment of the infrared-absorbing mark so that it is invisible to the naked eye, without causing any hindrance in practical use, and at the same time improving the image of the printed object, such as a prepaid card.

BRIEF DESCRIPTION OF THE DRAWINGS

Referring to the accompanying drawings.

DETAILED DISCUSSION

A typical example of infrared-absorbing mark-printed matter according to the present invention is illustrated below with reference to the accompanying drawings.

Figure 1:
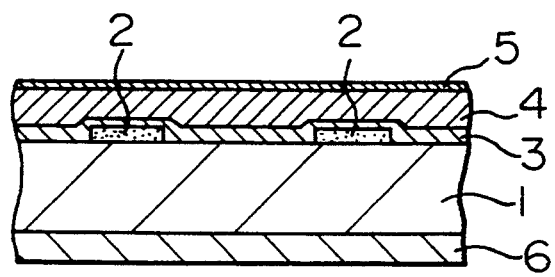
FIG. 1 is an enlarged sectional view of the principal parts of a prepaid card which is an example of infrared-absorbing mark-printed matter according to the present invention.

FIG. 1 is an enlarged sectional view of the principal parts of a prepaid card embodying the present invention. In the drawing, a substrate 1 serving as a white base, is made of, for example, a white colored polyester film. As the substrate, there can be used an ordinary transparent polyester film having formed thereon a magnetic layer which has thereon a white coating layer mainly composed of titanium oxide. It is desirable that the substrate used in the present invention have a reflectance of 40% or higher.

On the white substrate 1 is formed an infrared-absorbing mark 2. For forming this infrared-absorbing mark 2, an infrared-absorbing ink is prepared by mixing and dispersing an infrared-absorbing dye, such as PA-1006 (produced by Mitsui Toatsu Senryo K.K.) or SIR-103 (Mitsui Toatsu Senryo K.K.) or other material having a high infrared absorptivity, such as carbon, with binder resins, organic solvents and other necessary substances, and printing made on the white substrate 1 by using this ink to a thickness of 0.3 to 3 μm by gravure or screen printing to form a predetermined pattern.

A colored concealing layer 3 is formed over the white substrate 1 to make only faintly or hardly recognizable the infrared-absorbing mark 2 formed on the substrate 1. This colored concealing layer 3 is formed by offset, gravure or screen printing over the whole surface of the substrate 1, covering up the infrared-absorbing mark 2, by using an ink having a high light absorptivity in the visible region and pervious to light in the infrared region.

For eliminating the color of the infrared-absorbing mark, it is desirable that the colored concealing layer is one capable of absorbing light in the whole visible region. This layer, therefore, is preferably black or of a color close thereto, such as dark blue or purple. Such a colored concealing layer can be formed by printing with a specific ink prepared by mixing and dispersing an organic dye or pigment with binder resins, organic solvents and other necessary substances. The thickness of this layer is preferably within the range of 0.5 to 3 μm in view of concealing effect and restrictions on film thickness.

On the colored concealing layer 3 is formed a white concealing layer 4. This white concealing layer 4 is formed by screen printing on the colored concealing layer 3 with an ink prepared by mixing and dispersing a white pigment and an extender pigment, at least part of the particles of the extender pigment having an average size of from 3 to 20 μm, with binder resins, organic solvents and other necessary substances.

The extender pigment used in the white concealing layer 4 is preferably one of which at least part of the particles are those having an average size of from 3 to 20 μm. Use of an extender pigment having an average particle size of from 3 to 20 μm matts the white concealing layer 4, causing diffused reflection of light entering the white concealing layer 4, so that the infrared-absorbing mark 2, covered up by the colored concealing layer 3, is perfectly concealed so that it is invisible to the naked eye. Whiteness of this white concealing layer 4, due to use of a white pigment, serves for improving the image of the printed matter.

As the extender pigment, calcium carbonate, aluminum oxide, silicon oxide and the like are preferably used. These compounds are preferably of an average particle size of 3 to 20 μm, and more preferably 5 to 10 μm. It is to be noted, however, that when the pigment particles having the sizes less than 3 μm are mixed in a limited proportion, the matted white concealing layer 4 is improved in leveling. Accordingly, it is recommended to properly mix the pigment particles having sizes less than 3 μm with those having the above-specified range of average size. When all of the extender pigment particles used are those having an average particle size of less than 3 μm, it is impossible to matt the white concealing layer 4 and perfectly conceal the infrared-absorbing mark 2 so as to be invisible to the naked eye. The pigment particles having sizes greater than 20 μm may be caught in or cannot pass the meshes of the screen and fall off the white concealing layer 4 at the time of screen printing.

Regarding the content of the extender pigment in the white concealing layer 4, in case all of the pigment particles fall within the range of 3 to 20 μm in size, the desired effect can not be obtained when the content of the extender pigment is less than 10% by weight based on the whole solid matter in the white concealing layer 4, while when the content is higher than 45% by weight, the strength of the white concealing layer 4 is reduced. Therefore, the extender pigment is added so that its content will preferably be in the range of 10 to 45% by weight, the optimal range being 15 to 30% by weight, based on the standard. In case of mixing the pigment particles having the sizes less than 3 μm, such particles should be mixed so that their proportion to the whole particles of extender pigment will be less than 50% and that the content of the extender pigment particles having the sizes of 3 μm or greater will fall within the above-defined range.

As for the white pigment used in combination with the extender pigment in the present invention, it is desirable to use a pigment which is white in color and has a refractive index of 2 or greater (the greater the better), such as titanium oxide or zinc oxide. The particle size of the white pigment used in this invention is preferably in the range of 0.1 to 1 μm, more preferably 0.2 to 0.5 μm, because no sufficient concealing effect is obtained when the particle size is less than 0.1 μm, and the particles having the sizes greater than 1 μm tend to intercept the near infrared rays. As to the content of the white pigment, no sufficient concealing effect is provided when the content is less than 8% by weight based on the whole solid matter in the white concealing layer 4, and there takes place too much interception of the near infrared rays when the content is higher than 25% by weight, so that the content of the white pigment is preferably in the range of 10 to 30% by weight, more preferably 15 to 25% by weight, based on the standard.

The thickness of the white concealing layer 4 formed by printing with an ink containing a white pigment and a loading or extender pigment of which at least part of the particles are those having an average size of from 3 to 20 μm, is preferably within the range of 2 to 12 μm, more preferably 3 to 8 μm, because when the thickness is less than 2 μm the layer could be seen through with the naked eye, and when the thickness is greater than 12 μm the layer is liable to reflect the infrared rays.

A pattern 5 is formed on the white concealing layer 4 by printing, as by offset printing, with a specific ink prepared by mixing and dispersing an organic pigment or dye, not absorbing the near infrared rays, with binder resins, organic solvents and other necessary substances. It is not essential to form the pattern. The thickness of the pattern is preferably within the range of 0.5 to 2 μm because a greater thickness may produce a difference in level.

A magnetic layer 6 may be provided as desired on the underside of the white substrate 1. This magnetic layer can be formed by any suitable method. For example, a magnetic coating material is prepared by mixing and dispersing a magnetic powder with binder resins, organic solvents and other necessary substances, and this coating material is applied on the underside of the substrate 1 and dried by suitable means.

The binder resin used in forming the infrared-absorbing mark 2, colored concealing layer 3, white concealing layer 4 and pattern 5 is not critical in this invention, but it is selected by taking into consideration the adhesive force of the infrared-absorbing mark 2, colored concealing layer 3 and white concealing layer 4 between them or to the substrate 1 forming the base, mechanical strength of the infrared-absorbing mark 2, colored concealing layer 3, white concealing layer 4 and pattern 5, and other factors. Preferred examples of the binder resins usable in this invention include vinyl chloride-vinyl acetate copolymer, polyvinyl butyral resins, polyurethane resins, polyester resins, acrylic resins, polycarbonate resins and UV resins.

The organic solvent used in forming the mark and layers may be properly selected from those which are capable of well dissolving the binder resin used. Preferred examples of such organic solvents are methyl ethyl ketone, methyl isobutyl ketone, cyclohexanone, toluene, ethyl acetate, tetrahydrofuran and dioxane.

The magnetic powder used in forming the magnetic layer may be chosen from a variety of magnetic powders which are generally used for magnetic recording media, such as $\gamma$-$Fe_2O_3$ powder, $Fe_3O_4$ powder, Co-ferrite powder, Fe metal powder and barium ferrite powder. The binder resin and the organic solvent used for forming the magnetic layer may be also properly selected from those generally used for the magnetic recording media. Those used in forming the infrared-absorbing mark 2, colored concealing layer 3, white concealing layer 4 and pattern 5 can be favorably employed.

The concept of the infrared-absorbing mark printed matter according to the present invention is not limited to the private cards such as described above. It can as well be applied to various other types of cards, such as ID cards, magnetic cards, etc., various printed articles using a plastic substrate, printed books such as bankbooks provided with a magnetic layer at a part, and so on, in which the same effect as described above is produced.

Preferred Embodiments

The following examples further illustrate the present invention.

EXAMPLE 1

A desired bar code pattern was screen printed, so as to have a thickness after drying of 2 μm, on a 40 mm×76 mm×180 μm thick polyethylene terephthalate film containing titanium oxide by using an infrared-absorbing ink prepared by dissolving a composition consisting of 3 parts by weight of PA-1006 (a near infrared-absorbing dye produced by Mitsui Toatsu Senryo K.K.), 27 parts by weight of VAGF (vinyl chloride-vinyl acetate copolymer produced by U.C.C. Corp.) and 70 parts by weight of cyclohexanone.

On the polyethylene terephthalate film printed with the bar code pattern, gravure printing was performed with a black ink prepared by dissolving a composition consisting of 2 parts by weight of PS Black ME-3 (visible light absorbing dye produced by Mitsui Toatsu Senryo K.K.), 28 parts by weight of VAGF (vinyl chloride-vinyl acetate copolymer produced by U.C.C. Corp.), 3 parts by weight of Collonate L (a trifunctional low-molecular weight isocyanate compound produced by Nippon Polyurethane Kogyo K.K.) and 67 parts by weight of cyclohexanone, to form a colored concealing layer having a thickness after drying of 1 μm.

Figure 2:
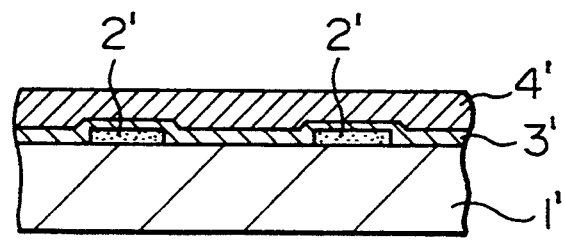
FIG. 2 is an enlarged sectional view of the principal parts of another prepaid card showing another example of infrared-absorbing mark-printed matter according to the present invention.

On this colored concealing layer was further formed a 7 μm thick white layer by screen printing with an ink prepared by mixing and dispersing 12 parts by weight of titanium oxide (average particle size: 0.3 μm), 15 parts by weight of calcium carbonate (ave. particle size: 10 μm), 14 parts by weight of VAGF (vinyl chloride-vinyl acetate copolymer produced by U.C.C.), 14 parts by weight of CA116 (polyurethane resin produced by Morton Corp.), 3 parts by weight of Collonate L and 110 parts by weight of cyclohexanone in a sand mill for 8 hours. There was thus formed a prepaid card having an infrared absorbing bar code, in which, as shown in FIG. 2, an infrared absorbing mark 2, a colored concealing layer 3 and a white concealing layer 4 are laminated successively on a polyethylene terephthalate film substrate 1 containing titanium oxide.

EXAMPLE 2

A prepaid card having an infrared absorbing bar code was made by following the same procedure as Example 1 except that in the composition of the ink used for forming the white concealing layer, calcium carbonate having an average particle size of 10 μm was replaced by the same amount of silicon oxide having an average particle size of 10 μm.

EXAMPLE 3

A prepaid card having an infrared absorbing bar code was made by following the procedure of Example 1 except that in the composition of the ink used for forming the white concealing layer, 15 parts by weight of calcium carbonate having an average particle size of 10 μm was replaced by a mixture of 11 parts by weight of calcium carbonate having an average particle size of 10 μm and 4 parts by weight of calcium carbonate having an average particle size of 0.7 μm.

EXAMPLE 4

A prepaid card having an infrared absorbing bar code was made by following the procedure of Example 1 except that in the composition of the ink used for forming the white concealing layer, calcium carbonate having an average particle of 10 μm was replaced by the same amount of calcium carbonate having an average particle size of 3 μm.

EXAMPLE 5

A prepaid card having an infrared absorbing bar code was made by following the procedure of Example 1 except that in the composition of the ink used for forming the white concealing layer, calcium carbonate having an average particle size of 10 μm was replaced by the same amount of calcium carbonate having an average particle size of 20 μm.

EXAMPLE 6

A prepaid card having an infrared absorbing bar code was made by following the procedure of Example 1 except that in the composition of the ink used for forming the white concealing layer, the amount of calcium carbonate used was changed from 15 parts by weight to 20 parts by weight, and that the amount of titanium white was changed from 12 parts by weight to 7 parts by weight.

EXAMPLE 7

A prepaid card having an infrared absorbing bar code was made by following the procedure of Example 1 except that in the composition of the ink used for forming the white concealing layer, the amount of calcium carbonate was changed from 15 parts by weight to 7 parts by weight, and that the amount of titanium white was changed from 12 parts by weight to 16 parts by weight.

EXAMPLE 8

Figure 3:
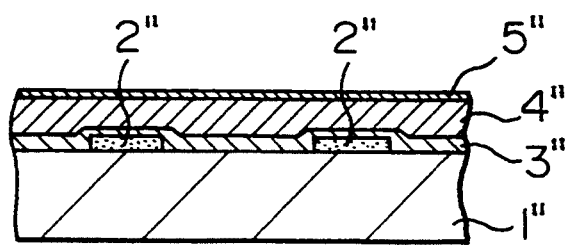
FIG. 3 is an enlarged sectional view of the principal parts of another prepaid card showing still another example of infrared-absorbing mark-printed matter according to the present invention.

A prepaid card having an infrared absorbing bar code was made by following the procedure of Example 1 except that on the white concealing layer of the private card obtained in Example 1, there was further formed a pattern by offset printing with a commercially available light blue UV ink (S type produced by Toyo Ink Mfg. Co., Ltd.). Thus, in this private card, as Shown in FIG. 3, an infrared absorbing mark 2", a colored concealing layer 3", a white concealing layer 4" and a pattern 5" are laminated successively on a polyethylene terephthalate film 1 containing titanium white.

COMPARATIVE EXAMPLE 1

A prepaid card having an infrared absorbing bar code was made by following the procedure of Example 1 except that in the composition of the ink used for forming the white concealing layer, calcium carbonate having an average particle size of 10 μm was replaced by the same amount of calcium carbonate having an average particle size of 0.7 μm.

COMPARATIVE EXAMPLE 2

A prepaid card having an infrared absorbing bar code was made by following the procedure of Example 1 except that in the composition of the ink used for forming the white concealing layer, calcium carbonate having an average particle size of 10 μm was not used.

The prepaid cards having an infrared absorbing bar code obtained in the Examples and the Comparative Examples described above were subjected to a visual test in which 10 panelists were asked to visually observe the cards under the sunlight and under a fluorescent lamp and tell whether they could recognize the bar code on each card. The number of the panelists who could recognize the bar code on each card was counted. Also, the reflectances of the bar code portion (A portion) and the no-bar-code portion (B portion) in each card were measured by using a print contrast meter (PCM-11) filter D, and the contrast ratio was calculated from (B−A)/B. The results are shown in Table 1.

TABLE 1

| | Number of panelists who recognized bar code | | Reflectance (%) | | Contrast ratio (B − A)/B |
|---|---|---|---|---|---|
| | Under sunlight | Under fluorescent lamp | A portion | B portion | |
| Example 1 | 0 | 0 | 15 | 80 | 0.81 |
| Example 2 | 0 | 0 | 17 | 80 | 0.79 |
| Example 3 | 0 | 0 | 18 | 80 | 0.78 |
| Example 4 | 1 | 0 | 15 | 80 | 0.81 |
| Example 5 | 0 | 0 | 16 | 80 | 0.80 |
| Example 6 | 2 | 0 | 14 | 80 | 0.83 |
| Example 7 | 0 | 0 | 16 | 80 | 0.80 |
| Example 8 | 0 | 0 | 18 | 78 | 0.77 |
| Comp. Example 1 | 10 | 8 | 14 | 80 | 0.83 |
| Comp. Example 2 | 10 | 10 | 14 | 80 | 0.83 |

As seen from Table 1, with the prepaid cards obtained in Examples 1 to 8 it is harder to recognize the bar code than with the prepaid cards obtained in Comparative Examples 1 and 2. Also, even when calcium carbonate of large particle size is used in the white concealing layer, the reflectance is not lowered and the bar code is hard to recognize. It is thus noted that the infrared-absorbing mark printed matter obtained according to the present invention can make the infrared absorbing mark invisible to the naked eye while maintaining a good image of its own.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An infrared-absorbing mark printed matter, comprising a substrate, an infrared-absorbing mark formed to a predetermined configuration on at least one surface of said substrate, said infrared-absorbing mark comprising an ink having high light absorptivity in the infrared region, a colored concealing layer comprising an ink having high light absorptivity in the visible region and pervious to light in the infrared region formed on said infrared-absorbing mark, and a white concealing layer comprising an ink containing a white pigment and extender pigment particles, formed on said colored concealing layer, at least a part of said particles of said extender pigment having an average size of from 3 to 30 $\mu$m.

2. An infrared-absorbing mark printed matter according to claim 1, wherein said extender pigment used in said white concealing layer is selected from at least one member of the group consisting calcium carbonate, silicon oxide and aluminum oxide.

3. An infrared-absorbing mark printed matter according to claims 1 or 2, wherein said white concealing layer is matted by said extender pigment particles, said white concealing layer having a thickness of from 3 to 8 $\mu$m.

4. An infrared-absorbing mark printed matter according to claim 1, wherein said extender pigment particles are present in an amount of from 10 to 45% by weight.

5. An infrared-absorbing mark printed matter according to claim 1, wherein said colored concealing layer ranges in thickness of from 0.5 to 3 $\mu$m.

* * * * *